(12) United States Patent
Owens

(10) Patent No.: US 7,428,858 B2
(45) Date of Patent: Sep. 30, 2008

(54) FEEDWORKS DEVICE

(76) Inventor: William M Owens, 15376 Glenwood Rd., SW, Port Orchard, WA (US) 98367

(*) Notice: Subject to any disclaimer, the term of this patent is extended or adjusted under 35 U.S.C. 154(b) by 1547 days.

(21) Appl. No.: 09/053,832

(22) Filed: Apr. 1, 1998

(65) Prior Publication Data

US 2001/0045150 A1 Nov. 29, 2001

(51) Int. Cl.
B26D 7/06 (2006.01)
B65G 15/44 (2006.01)

(52) U.S. Cl. .......... 83/155; 83/435; 83/425.4; 83/435.2; 83/436.15; 83/431; 83/156; 144/376; 144/245.2; 158/699

(58) Field of Classification Search ........... 83/435, 83/425.2, 425.3, 425.4, 435.2, 436.15, 431, 83/422, 155, 156; 144/376, 245.2, 245.1, 144/242.1, 250.16, 250.13; 198/690.2, 699, 198/842, 834, 498
See application file for complete search history.

(56) References Cited

U.S. PATENT DOCUMENTS

| | | | | |
|---|---|---|---|---|
| 2,375,065 A | * | 5/1945 | Askue | 198/699 |
| 2,664,927 A | * | 1/1954 | Pierce | 83/435.2 X |
| 2,999,518 A | * | 9/1961 | Mowery et al. | 83/425.2 X |
| 4,009,741 A | * | 3/1977 | Zimmerman | 144/250.13 X |
| 4,015,484 A | * | 4/1977 | Taylor | 198/842 X |
| 4,195,346 A | * | 3/1980 | Schroder | 364/475 |
| 4,207,472 A | * | 6/1980 | Idelsohn et al. | 250/563 |
| 4,269,245 A | * | 5/1981 | Fornell et al. | 144/245 A |
| 4,449,958 A | * | 5/1984 | Conrad | 198/834 X |
| 4,485,705 A | * | 12/1984 | Moilanen | 83/39 |
| 4,681,005 A | * | 7/1987 | Baranski | 83/422 X |
| 4,794,963 A | * | 1/1989 | Oppeneer | 144/358 |
| 4,938,111 A | * | 7/1990 | Masse | 83/435 X |
| 5,088,363 A | * | 2/1992 | Jones et al. | 83/35 |
| 5,105,698 A | * | 4/1992 | Dunham | 83/435.2 X |
| 5,203,246 A | * | 4/1993 | Smitterberg et al. | 83/435.2 X |
| 5,205,705 A | * | 4/1993 | Jenkner | 414/796.8 |
| 5,381,712 A | * | 1/1995 | Head, Jr. et al. | 83/418 |
| 5,396,938 A | * | 3/1995 | Cannaday | 83/425.4 X |
| 5,456,148 A | * | 10/1995 | Hoffa | 83/155 |
| 5,637,068 A | * | 6/1997 | Chambers | 144/376 X |

* cited by examiner

Primary Examiner—Boyer D. Ashley
(74) Attorney, Agent, or Firm—Lowe, Hauptman, Ham & Berner, LLP

(57) ABSTRACT

An apparatus for feeding flat, rigid material through a cutter comprising a continuous drive conveyor belt with a non-skid face, having one or more Guide 'V' belts bonded to its reverse side parallel to the direction of movement, which 'V' belts communicate with corresponding 'V' grooves in the power rollers and the rollers of the feed bed, another continuous drive conveyor belt on the out-put side of the cutter, the movement of both conveyors being synchronized by a timing/drive belt which transfers the motor drive to the inside rollers of the out-put and the input sides, and having from above regularly spaced hold-down rollers along the span of both conveyors to keep the rate of movement of the flat material through the cutter consistent. This apparatus has its preferred application in the lumber industry for trimming defects and/or wanes from wood boards, so that the boards maintain consistent position in the horizontal plane while traveling through the cutters.

5 Claims, 5 Drawing Sheets

FEEDWORKS DEVICE

BACKGROUND OF THE INVENTION

This invention relates to a mechanism to move rigid flat material through a cutter so that the material remains in constant orientation to the cutter as it passes through the cutter and, more particularly, to a mechanism to move wooden boards containing defects through trimmer saws to yield useable boards.

It is known that boards with defects or wanes can be optically scanned and the largest piece of useable wood cut therefrom by computer analysis. See S. J. Oppeneer, U.S. Pat. No. 4,794,963 and J. M. Idelsohn, U.S. Pat. No. 4,207,472. The previous attempts to accomplish the goals of this invention have utilized standard rollers to move the boards past the cutting saws plus hold-down rollers from above and a fence along one side. See U. Moilanen, U.S. Pat. No. 4,485,705 and E. G. Fornell, U.S. Pat. No. 4,269,245. The way the prior art attempts to maintain constant orientation of the boards to the trimming saws is by means of gripping clamps which damage the wood being trimmed. See A. U. Jones, U.S. Pat. No. 5,088,363 and G. W. Head Jr., U.S. Pat. No. 5,381,712.

Another known means for transporting the material to the cutter is a slat-bed transport device, which consists of multiple parallel chains on which cross "slats" are affixed at regular intervals along a continuous loop of traveling chain. The chains usually ride in a track and there are 'V' block attachments on the underside of the cross slats which ride upon a 'V' guide. This means of transporting material to a cutter has many complex parts which are more expensive to manufacture and to maintain than this invention and require regular lubrication, which lubricant can transfer to the material being transported and stain it. The metal slats do not maintain the alignment of the material with the cutter unless they are equipped with spikes or a rough surface which mars the material to be cut just as do the gripping clamps of referred to above.

The primary object of this invention is to provide a device to maintain the precise orientation of a board to cutting or shaping mechanisms and to move the board through the cutting or shaping mechanisms at a constant rate without marring the surface of the wood.

SUMMARY OF INVENTION

These objects are achieved by this invention in that boards are fed through cutting saws, being adjustable in distance from each other, by means of an input and an out-put continuous drive conveyor belt with non-skid face being maintained in constant alignment with the cutting saws by means of Guide 'V' belts bonded to their reverse side, which 'V' belts communicate with corresponding 'V' grooves in the power rollers and the rollers of the feed bed, and constant alignment with each other by a timing/drive belt which transfers the motor drive to the inside rollers of the output and the input sides, while spring powered hold-down rollers press the board against the non-skid face of the belt, so that the board does not move side to side or chatter up and down when it is being cut.

The novel features of the invention will be best understood from the following description in light of the accompanying drawings. While particular embodiments of the present invention are shown and described, it will be obvious to those skilled in the art that changes and modifications may be made without departing from this invention in its broader aspects and, therefore, the aim of the appended claims is to cover all such changes and modifications as fall within the true spirit and scope of this invention.

DESCRIPTION OF THE PREFERRED EMBODIMENTS

Figure 1:
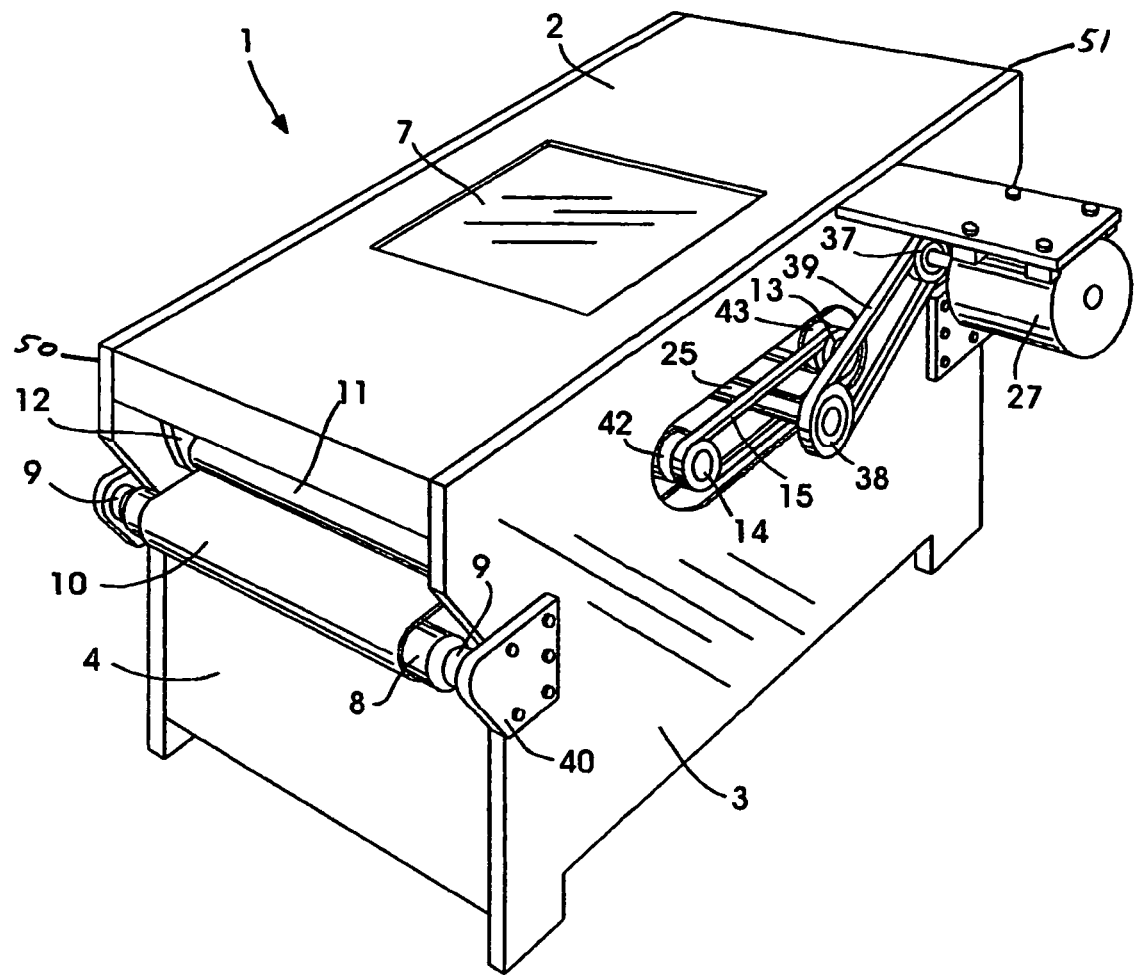
FIG. 1 is a side aspect view of the Feedworks Device from the input end.
Figure 2:
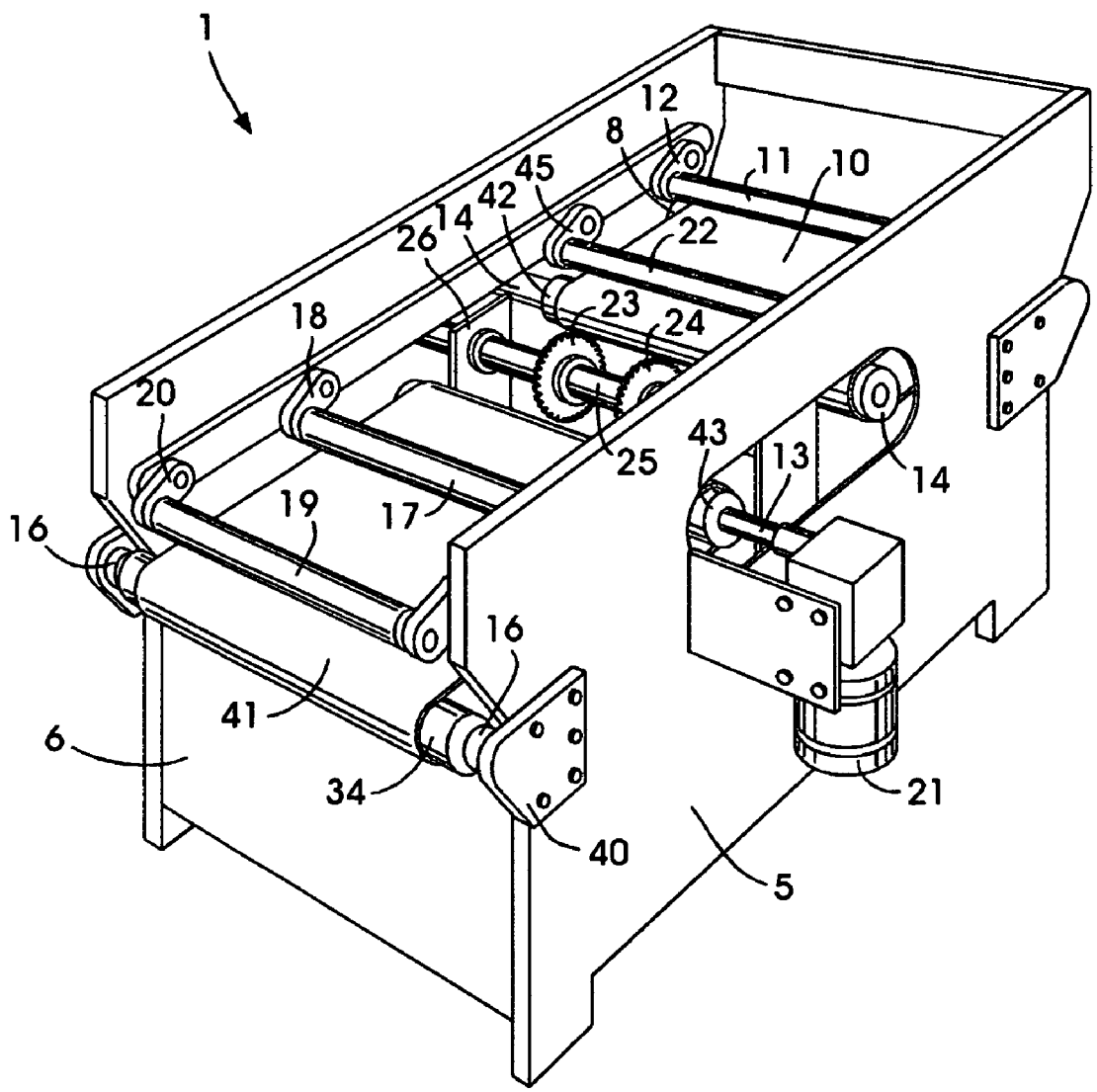
FIG. 2 is a side aspect view of the Feedworks Device from the output end.

With specific reference to FIGS. 1 and 2, the Feedworks Device (1) is shown being comprised of an input cover (4), a right side cover (3), a left side cover (5), a top cover (2) with window (7) of opaque shatter-proof material, and an output end cover (6) of rigid material, such as steel, and strengthened by reinforcement plates (40) as necessary to accommodate the operating elements. The preferred embodiment thereof being comprised of an input continuous drive conveyor belt (10) and an output continuous drive conveyor belt (41), each of identical composition and having a non-skid top surface (28), such as No. 37 Scandera Red Carbox Rough Top on 3 ply 135 pound polyester 9/32 inch thick with an underside of Friction Surface (Caroxilated nytril X F.S.), a bottom surface (29) to which is bonded one or more Guide 'V' belts (30), extending a distance from the bottom surface (29) and having sufficient width to engage a 'V' groove (31) in a feed roller such as a Browning Manufacturing Company Grip Notch grip belt commonly known as an "A" section belt and having scallop shaped cuts partially through its thickness across its width and regularly spaced along its length, parallel to and stretching the entire length of the belts.

The one continuous drive conveyor belt (10) travels around an inside feed roller (42) on the input side and a feed roller (8) at the input end (50) and the other continuous drive conveyor belt (41) travels around an inside feed roller (43) on the output side and a feed roller (34) at the output end (51). The distance from the respective inside feed rollers (42, 43) and feed rollers (8, 34) being adjustable at the feed roller mount (9, 16) so as to maintain proper tension on the continuous drive conveyor belt so that it does not slip on the rollers.

Figure 4:
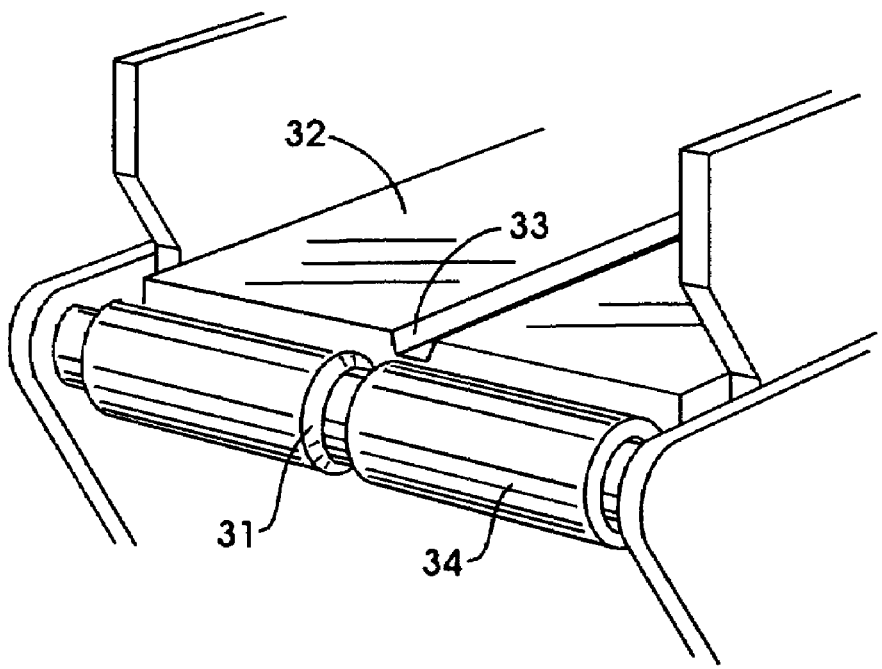
FIG. 4 is a break out view of a roller and the bed of the Feedworks Device.
Figure 5:
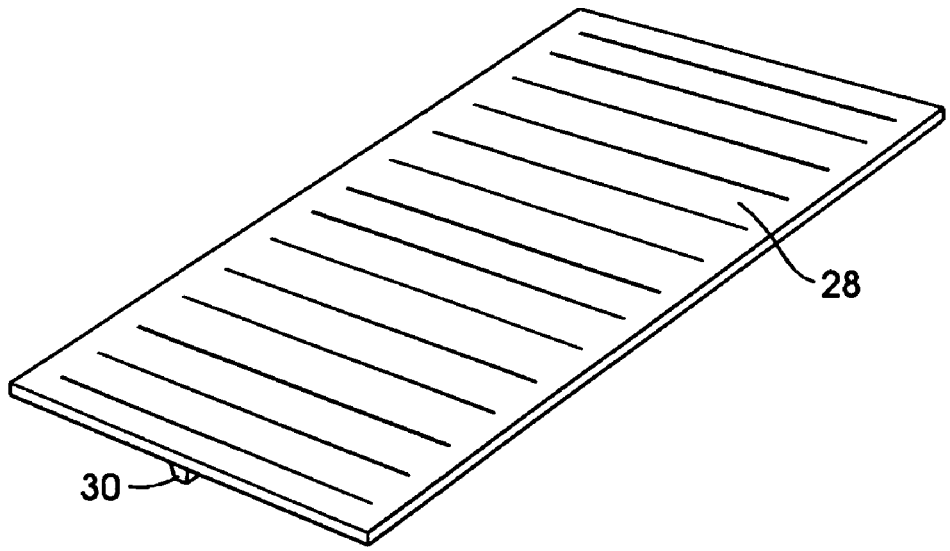
FIG. 5 is an aspect view of the surface of the conveyor belt which contacts the product to be cut.
Figure 6:
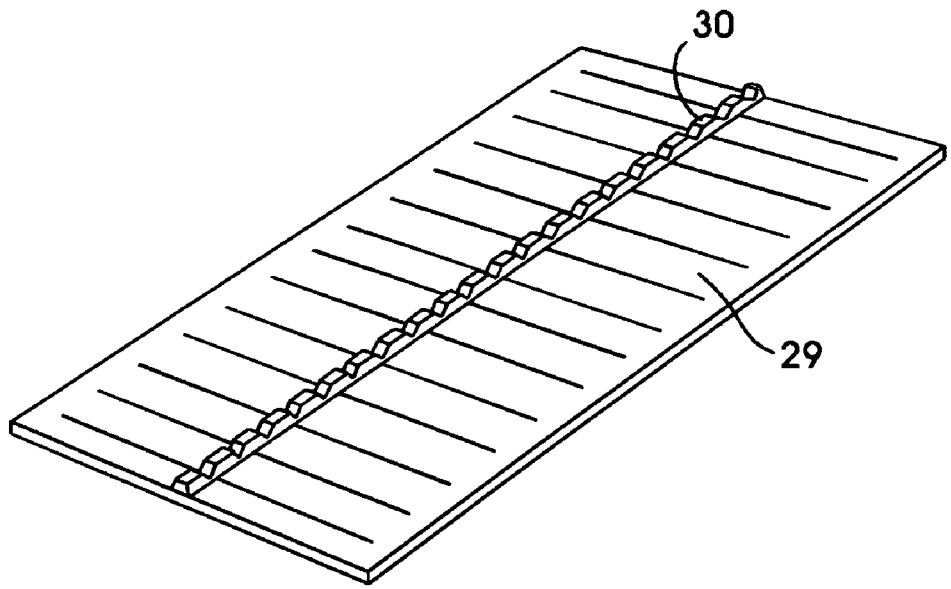
FIG. 6 is an aspect view of the surface of the conveyor belt opposite from that shown in FIG. 5.
Figure 7:
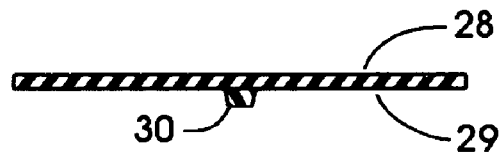
FIG. 7 is a cross sectional view of the conveyor belt.

With reference to FIGS. 4, 5, and 6, it is shown said rollers (8, 34, 42, 43) are provided with one or more 'V' grooves (31) to accept the guide 'V' belt (30), as is the feed bed (32) provided with one or more 'V' grooves (33) to accept the guide 'V' belt (30) bonded to the bottom surface (29) of the continuous drive conveyor belt (10, 41) so that the continuous drive conveyor belt remains in constant horizontal relationship to the feed rollers and the circular saw blades(s) (23, 24) or shaping tool(s) (46). The speed of the input continuous drive conveyor belt (10) is matched with the speed of the output continuous drive conveyor belt (41) by means of a timing belt (15) between the powered shaft (13) of the inside feed roller (43) on the output side, powered by a feed roller drive motor (21), to the slaved shaft (14) of the inside feed roller (42) on the input side, while the feed roller (8) at the input end (50) and the feed roller (34) at the output end (51) are turned be the continuous drive conveyor belts. Thus all feed rollers have the same operating revolutions per minute (RPM).

Figure 3:
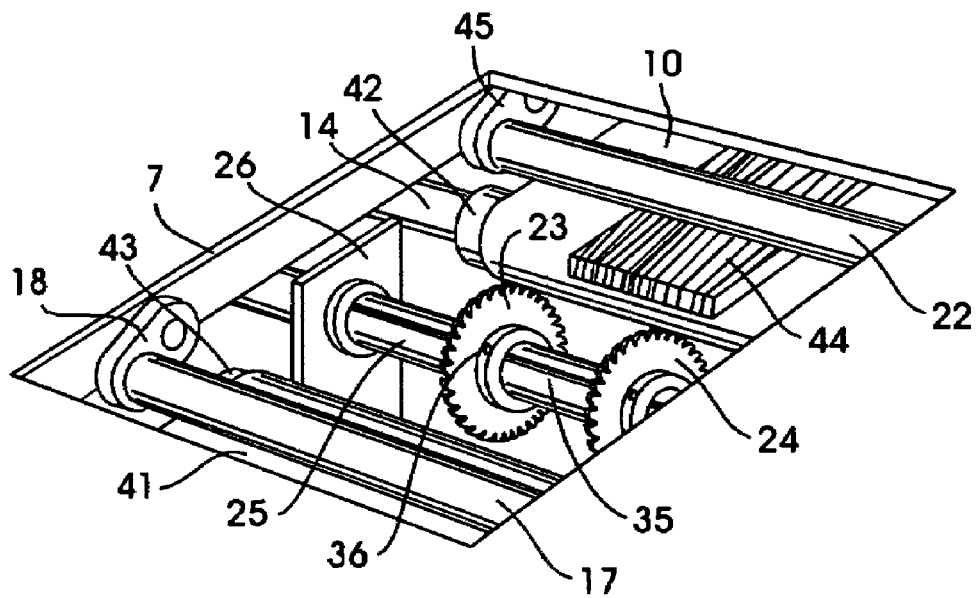
FIG. 3 is a break out view of the saws arrangement from above.

With specific reference to FIG. 3, the relationship between the input continuous drive conveyor belt (10) and the output continuous drive conveyor belt (41) and the circular saw blade(s) (23, 24) or shaping tool(s) (46), adjustably set along the length of the saw drive shaft (25) by means such as an adjustable mounting screw for the saw blade (36) removably set into a mounting channel (35) which runs along the length of the saw drive shaft (25) inside the saw drive shaft mount (26) on the inside of the right side cover (3) and the left side cover (5), with the saw drive shaft extending through the right side cover (3) so that the saw drive shaft slave pulley (38) mounted at the end of the saw drive shaft (25) communicates to the saw blade drive motor (27) via a saw drive shaft drive belt (39) to the saw motor drive pulley (37).

With reference to FIGS. 1 and 3, it is shown that once a wooden board (44) or other flat, rigid, cuttable piece of material, having a length greater than its width, enters the Feedworks Device (1) on the input continuous drive conveyor belt (10) over the feed roller (8) at the input end (50). it is held in a fixed horizontal relationship to the circular saw blade(s) (23, 24) or shaping tool(s) (46) by the non-skid top surface (28) of the input continuous drive conveyor belt (10) and a holddown roller (11) at the input end (50) and an inside holddown roller (22) on the input side, said holddown rollers having a non-marring surface and applying pressure to the top of the wooden board (44) by means of a spring or pneumatic cylinder loaded arm (12, 45), while the Feedworks Device (1) has a similar output continuous drive conveyor belt (41) with an inside hold down roller (17) on the output side and a hold down roller (19) at the output end (51), applying sufficient pressure to the top of the sawn pieces of the wooden board (44) by means of a spring or pneumatic cylinder loaded arm (12, 18, 20, 45), so that the wooden board (44) being cut maintains a constant orientation to the saw blade (23, 24) or shaping means.

Figure 8:
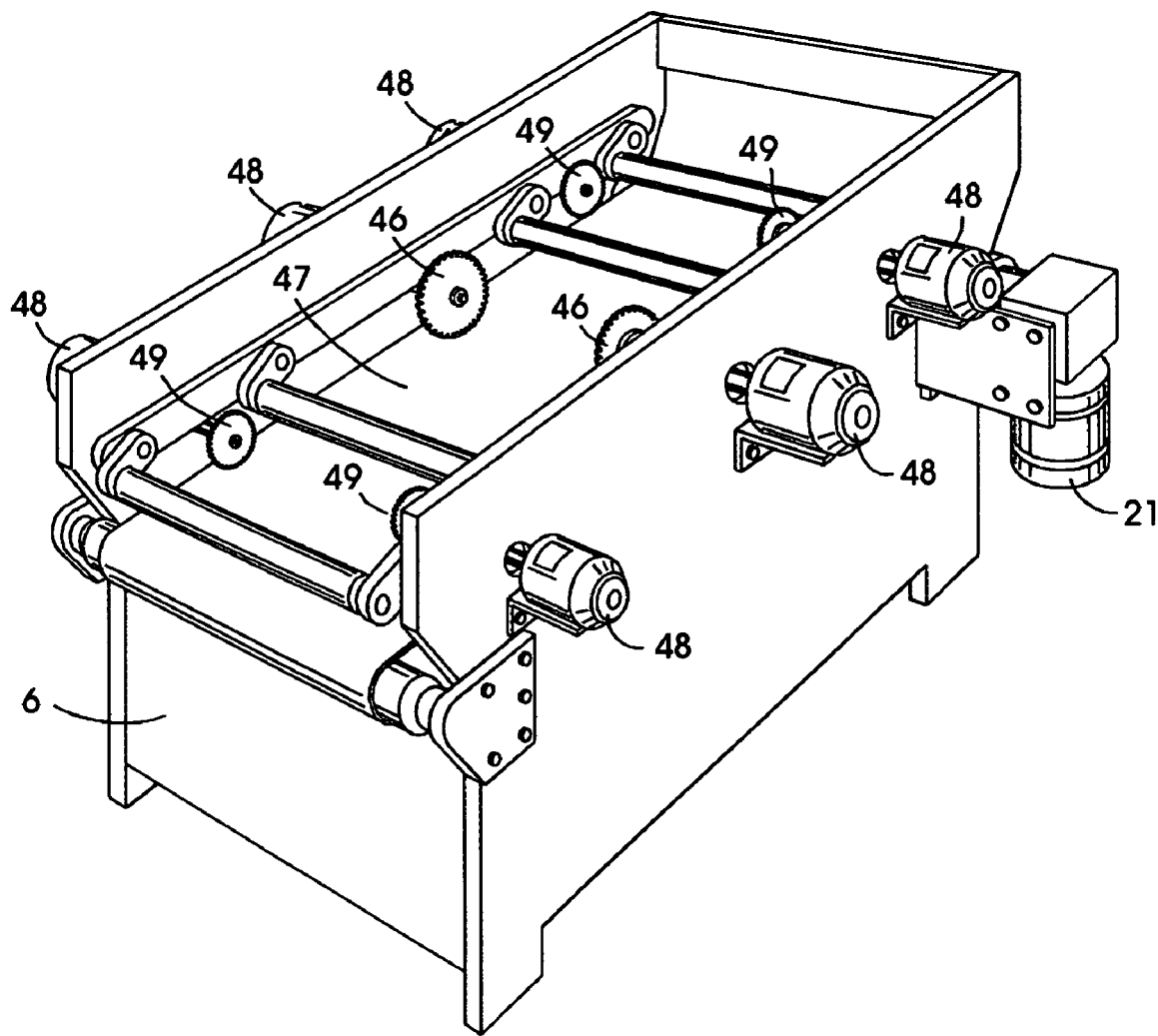
FIG. 8 is an aspect view of an alternative form of the Feedworks Device from the output end.

With reference to FIG. 8, an alternative embodiment of the invention is comprised of a single non-skid continuous conveyor belt (47) which spans the input (4) to the output (6) end covers in situations where the cutting or shaping means (46) is above and does not interfere with the non-skid continuous conveyor belt. Such alternative cutting or shaping means include router cutting tools and overhead saws.

Also in reference to FIGS. 2 and 8, it is apparent that the single saw drive shaft (25) can be replaced with multiple saw or shaper cutters (49), each with its own power drive means, such as arbor motors (48) and located along the run of the continuous drive conveyor belt(s) (10, 41, 47) to cut, shape, or trim the edges, of the wooden board.

Also with reference to FIGS. 2 and 3, it is apparent that non-skid continuous conveyor belts (10, 41, 47) can be combined with more than one cutting or shaping tool and combined to form multiple machining stations. Another alternative embodiment of the invention utilizes high pressure abrasive cutting means.

I claim:

1. A method of processing material, comprising the steps of:

a) providing a processing apparatus comprising input and output conveyors installed in series and spaced apart from each other for carrying the material to be processed in a working direction, each of the input and output conveyors including an endless belt having an non-skid upper surface adapted to carry the material and a lower opposing surface provided thereon with a guiding strip extending longitudinally of the endless belt, and a pair of input-side and output-side pulleys having horizontal axes of rotation around which the endless belt is trained with the non-skid upper surface facing outwardly and the guiding strip extending in a plane substantially parallel with the working direction, each of the pulleys having a groove extending continuously circumferentially around the pulley and in the plane for engaging the strip thereby preventing transverse displacements of the endless belt with respect to the working direction, said apparatus further comprising a processing unit disposed between the input and output conveyors for processing the material;

b) carrying the material on the non-skid upper surface of the input conveyor toward the processing unit;

c) processing the material with said processing unit; and d) carrying the processed material on the non-skid upper surface of the output conveyor away from the processing unit wherein steps b) and d) are performed without positive lateral edge contact of the material with said apparatus.

2. A processing apparatus, comprising:

Input and output conveyors installed in series and spaced apart from each other for carrying material to be processed in a working direction, each of said input and output conveyors including an endless belt having an non-skid upper surface adapted to carry said material and a lower opposing surface provided thereon with a guiding strip extending longitudinally of said endless belt; and a pair of input-side and output-side pulleys having horizontal axes of rotation around which said endless belt is trained with said non-skid upper surface facing outwardly and said guiding strip extending in a plane substantially parallel with the working direction, each of said pulleys having a groove extending continuously circumferentially around said pulley and in said plane for engaging said strip, thereby preventing transverse displacements of said endless belt with respect to the working direction;

a processing unit disposed between said input and output conveyors for processing said material;

wherein said output-side pulley of said input conveyor and said input-side pulley of said output conveyor are driven by a single power unit to rotate at substantially the same speed; and wherein said input-side pulley of said input conveyor and said output-side pulley of said output conveyor are passively driven by said output-side pulley of said input conveyor and said input-side pulley of said output conveyor, respectively, via said endless belts of said input and output conveyors, respectively.

3. A processing apparatus, comprising:

Input and output conveyors installed in series and spaced apart from each other for carrying material to be processed in a working direction, each of said input and output conveyors including an endless belt having an non-skid upper surface adapted to carry said material and a lower opposing surface provided thereon with a guiding strip extending longitudinally of said endless belt; and a pair of input-side and output-side pulleys having horizontal axes of rotation around which said endless belt is trained with said non-skid upper surface facing outwardly and said guiding strip extending in a plane substantially parallel with the working direction, each of said pulleys having a groove extending continuously circumferentially around said pulley and in said plane for engaging said strip, thereby preventing transverse displacements of said endless belt with respect to the working direction;

a processing unit disposed between said input and output conveyors for processing said material;

wherein said strip has two side faces and a top face all extending longitudinally of said endless belt, said side faces tapering away from said opposing surface and ending at said top face;

wherein said strip is provided with a plurality of V-shaped notches distributed longitudinally of said endless belt and extending from said top face toward, without contacting with, said opposing surface.

4. The apparatus of claim 1, wherein said grooves of said pulleys are in constant contact with said strip.

5. The apparatus of claim 1, wherein said strip extends continuously throughout an entire length of said endless belt.

* * * * *